(12) United States Patent
Nilsson et al.

(10) Patent No.: US 9,934,195 B2
(45) Date of Patent: Apr. 3, 2018

(54) SHARED RESOURCE DIGITAL SIGNAL PROCESSORS

(71) Applicant: MEDIATEK SWEDEN AB, Linköping (SE)

(72) Inventors: Anders Nilsson, Linköping (SE); Eric Tell, Linköping (SE)

(73) Assignee: Mediatek Sweden AB (SE)

( * ) Notice: Subject to any disclaimer, the term of this patent is extended or adjusted under 35 U.S.C. 154(b) by 294 days.

(21) Appl. No.: 14/364,643

(22) PCT Filed: Nov. 28, 2012

(86) PCT No.: PCT/SE2012/051319
§ 371 (c)(1),
(2) Date: Jun. 11, 2014

(87) PCT Pub. No.: WO2013/095256
PCT Pub. Date: Jun. 27, 2013

(65) Prior Publication Data
US 2014/0359252 A1     Dec. 4, 2014

(30) Foreign Application Priority Data
Dec. 21, 2011  (SE) ...................................... 1151233

(51) Int. Cl.
*G06F 9/38* (2006.01)
*G06F 15/78* (2006.01)
*G06F 9/30* (2018.01)

(52) U.S. Cl.
CPC .......... *G06F 15/78* (2013.01); *G06F 9/30036* (2013.01); *G06F 9/3828* (2013.01); *G06F 9/3891* (2013.01)

(58) Field of Classification Search
CPC ..................................................... G06F 9/3891
See application file for complete search history.

(56) References Cited

U.S. PATENT DOCUMENTS 5,010,477 A    4/1991  Omoda et al.
5,825,677 A *  10/1998 Agarwal ............. G06F 15/8092
                                                 708/520

(Continued)

FOREIGN PATENT DOCUMENTS

GB    2 449 168 A    11/2008
SE    1151231-6      12/2011

(Continued)

OTHER PUBLICATIONS

International Search Report for corresponding PCT/SE2012/051319, completed Feb. 13, 2013 by Marina Moraiti of the EPO.

(Continued)

*Primary Examiner* — Yuqing Xiao
(74) *Attorney, Agent, or Firm* — Tarolli, Sundheim, Covell & Tummino LLP

(57) ABSTRACT

A multicore processor is achieved by a processor assembly, comprising a first processor having a first core and at least a first and a second unit, each being selected from the group of vector execution units, memory units and accelerators, said first core and first and second units being interconnected by a first network, and a second processor having a second core wherein the first core is arranged to enable the second core to control at least one of the units in the first processor. Each processors generally comprises a combination of execution units, memory units and accelerators, which may be controlled and/or accessed by units in the other processor.

12 Claims, 3 Drawing Sheets

(56) References Cited

U.S. PATENT DOCUMENTS

| | | | | |
|---|---|---|---|---|
| 6,240,521 | B1* | 5/2001 | Barber | G06F 1/3203 713/323 |
| 6,480,952 | B2* | 11/2002 | Gorishek, IV | G06F 9/3879 703/26 |
| 6,983,389 | B1* | 1/2006 | Filippo | G06F 1/3203 713/322 |
| 7,117,389 | B2* | 10/2006 | Luick | G06F 11/2028 714/10 |
| 7,353,364 | B1* | 4/2008 | Chong | G06F 9/3802 712/215 |
| 2005/0066079 | A1* | 3/2005 | Luick | G06F 11/2028 710/36 |
| 2006/0179196 | A1 | 8/2006 | Gray | |
| 2006/0259738 | A1* | 11/2006 | Hudepohl | G06F 9/3836 712/34 |
| 2007/0083870 | A1* | 4/2007 | Kanakogi | G06F 9/3824 718/105 |
| 2007/0198815 | A1* | 8/2007 | Liu | G06F 7/4812 712/221 |
| 2007/0226454 | A1 | 9/2007 | Stoian et al. | |
| 2008/0059771 | A1* | 3/2008 | Svendsen | G06F 9/3017 712/218 |
| 2008/0177979 | A1 | 7/2008 | Stefan et al. | |
| 2010/0153686 | A1* | 6/2010 | Frank | G06F 9/3851 712/34 |
| 2011/0153987 | A1 | 6/2011 | Luke et al. | |
| 2011/0161630 | A1* | 6/2011 | Raasch | G06F 9/30196 712/205 |
| 2013/0151817 | A1* | 6/2013 | Lahteenmaki | G06F 9/30087 712/208 |
| 2014/0164734 | A1* | 6/2014 | Muff | G06F 9/3836 712/16 |

FOREIGN PATENT DOCUMENTS

| | | |
|---|---|---|
| WO | WO 2004/090716 A1 | 10/2004 |
| WO | WO 2005/096143 A | 10/2005 |

OTHER PUBLICATIONS

Search Report for Swedish Application No. 1151233-2 dated Aug. 31, 2012.

* cited by examiner

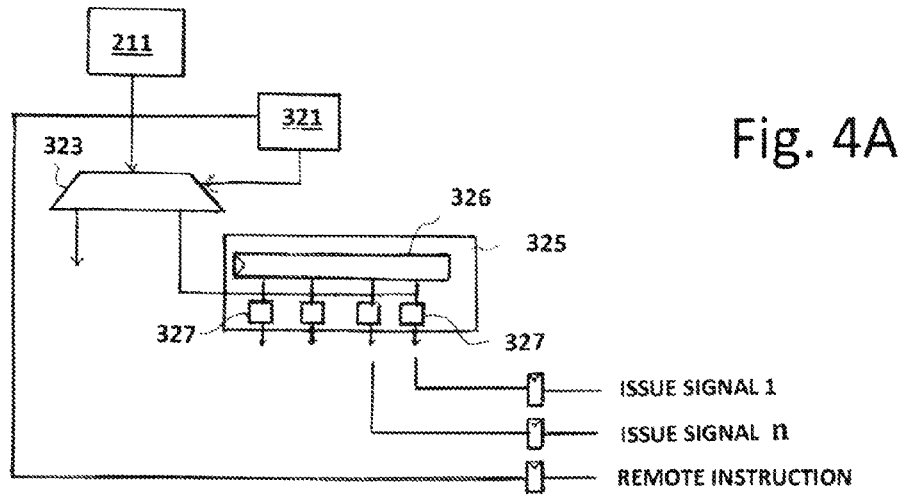
Fig. 4A
| 1 | 0 | 0 | 0 | 0 | 0 | 0 | 0 | 1 |
Fig. 4B
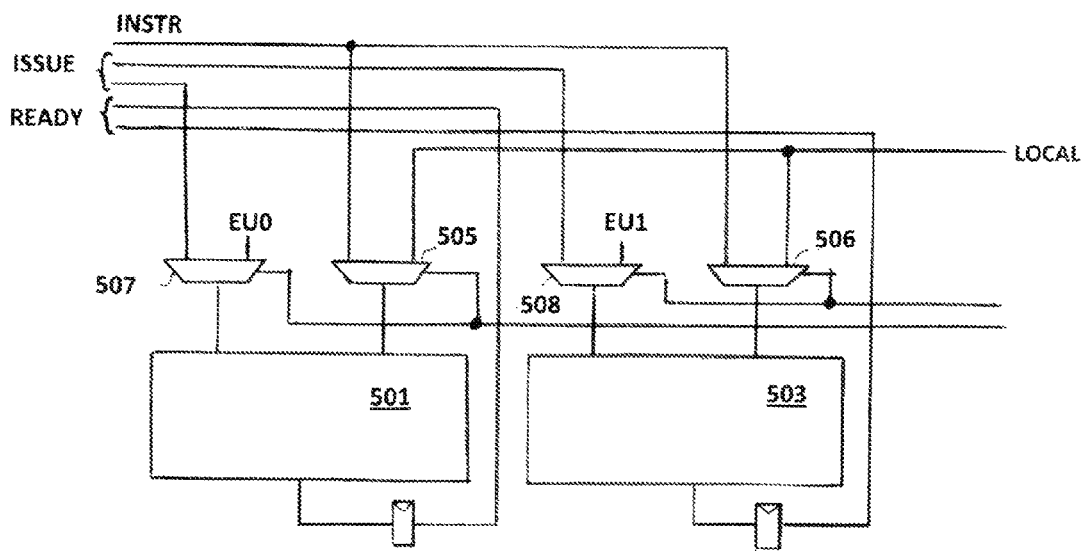
Fig. 5

SHARED RESOURCE DIGITAL SIGNAL PROCESSORS

RELATED APPLICATIONS

The present invention is a U.S. National Stage under 35 USC 371 patent application, claiming priority to Serial No. PCT/SE2012/051319, filed on 28 Nov. 2012; which claims priority from SE 1151233-2, filed 21 Dec. 2011, the entirety of both which is incorporated herein by reference.

TECHNICAL FIELD

The present invention relates to a processor assembly.

BACKGROUND AND RELATED ART

Many mobile communication devices use a radio transceiver that includes one or more digital signal processors (DSP).

For increased performance and reliability many mobile terminals presently use a type of DSP known as a baseband processor (BBP), for handling many of the signal processing functions associated with processing of the received the radio signal and preparing signals for transmission.

Many of the functions frequently performed in such processors are performed on large numbers of data samples. Therefore a type of processor known as Single Instruction Multiple Data (SIMD) processor is useful because it enables the same instruction to be performed for a whole vector of data rather than on one integer at a time. This kind of processor is able to process vector instructions, which means that a single instruction performs the same function to a limited number of data units. Data are grouped into bytes or words and packed into a vector to be operated on.

As a further development of SIMD architecture, Single Instruction stream Multiple Tasks (SIMT) architecture has been developed. Traditionally in SIMT architecture one or two vector execution units using SIMD data-paths have been provided in association with an integer execution unit which may be part of a core processor.

International Patent Application WO 2007/018467 discloses a DSP according to the SIMT architecture, having a processor core including an integer processor and a program memory, and two vector execution units which are connected to, but not integrated in the core. The vector execution units may be Complex Arithmetic Logic Units (CALU) or Complex Multiply-Accumulate Units (CMAC). The data to be processed in the vector execution units are provided from data memory units connected to the vector execution units through an on-chip network.

In large multi-core systems it is difficult to affect the partitioning and to plan the resource requirements ahead. To increase the flexibility it would be useful to enable a processor to borrow resources from another digital signal processor. This may be done in the prior art by performing a remote procedure call. This involves transferring data to a memory of the other processor and requesting execution of a function by the other processor. The resulting data must then be transferred back to a memory of the first digital signal processor. This occupies a considerable amount of control capacity in the second digital signal processor, which is inefficient.

An alternative solution, which is common in digital signal processors is to let a number of processors share one memory that can be accessed by all processors. The memory may be a data memory, a program memory or a combined data and program memory. Memories that can be accessed from several processors are expensive and difficult to handle in terms of cache arbitration. They become unpredictable and difficult to synchronize.

SUMMARY OF THE INVENTION

Hence it is an objective of the present invention to enable an increase of the capacity of a DSP. This is achieved according to the invention by a digital signal processor as defined above having the features of the characterizing portion of claim 1.

According to the invention two digital signal processors are connected by means of a bridge. Each of the processors comprises a core, and one or more other units connected by an on-chip network. The units may be complex computing units, scalar computing units, memory units, accelerators and any other unit that may be used in a SIMT based DSP.

By means of the bridge, the first DSP can access all resources in the second DSP, and vice versa. If the first processor wishes to use a element, such as an execution unit or an accelerator, or access a memory, that is found in the second processor, this can be done through the bridge, by the first processor temporarily taking over control of the element. Instruction issue logic arranged in the second processor temporarily gives up control of the element to the issue logic arranged in the first processor. Data is sent directly from the program memory of the first DSP to the execution unit of the second DSP that is to perform the instruction.

The invention enables sharing of vector execution units, accelerators, memories and other units between two digital signal processors. This can be used to temporarily increase the capacity for one of the processors. In particular, for example, a type of unit that is needed by both units, but not used very much can be arranged only in one of the processors and accessed easily by both. Also, instead of storing the same data in both processors, they need only be stored in a memory in one of the processors and can be accessed easily by both processors.

BRIEF DESCRIPTION OF THE DRAWINGS

FIG. 4 shows an embodiment of the issue logic applied to the remote side, seen from the local side.

FIG. 5 shows an embodiment of the issue logic seen from the remote side.

DETAILED DESCRIPTION OF EMBODIMENTS

Figure 1:
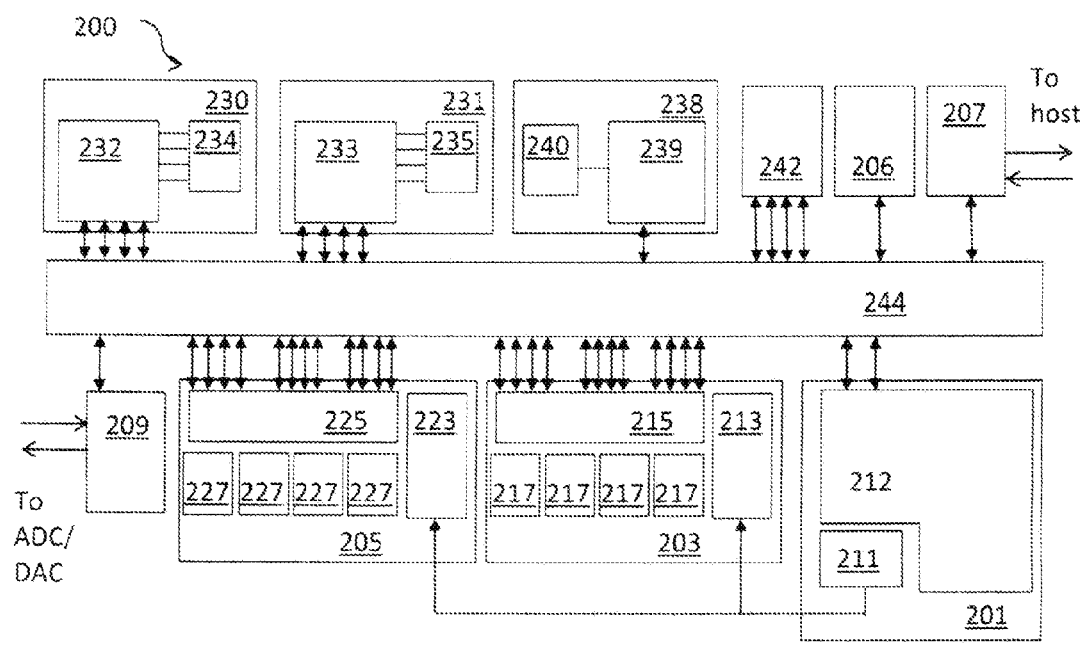
FIG. 1 shows a SIMT type DSP which may be used according to the invention.

FIG. 1 shows an example of a prior art digital signal processor 200 according to the SIMT architecture, that may form the basis for the invention. The processor 200 includes a controller core 201 and a first 203 and a second 205 vector execution unit, known per se.

A host interface unit 207 provides connection to a host processor (not shown in FIG. 2), possibly through a unit such as a MAC processor. A digital front end unit 209 provides connection to units for transmitting and receiving signals (not shown) in a manner well known in the art.

As is common in the art, the controller core 201 comprises a program memory 211 as well as instruction issue logic and functions for multi-context support. For each execution context, or thread, supported these include a program counter, stack pointer and register file (not shown explicitly in FIG. 1). Typically, 2-3 threads are supported.

The controller core 201 also comprises an integer execution unit 212 comprising a register file RF, a core integer memory ICM, a multiplier unit MUL and an Arithmetic and Logic/Shift Unit (ALSU). The ALSU may also be implemented as two units, Arithmetic Unit and Logic and Shift Unit. These units are known in the art and are not shown in FIG. 1.

The first vector execution unit 203 in this example is a CMAC vector execution unit, and the second vector execution unit 205 is a CALU vector execution unit. Both these vector execution units are known per se. Each vector execution unit 203, 205 comprises a vector controller 213, 223, a vector loadstore unit 215, 225 and a number of data paths 217, 227, respectively. The vector controllers 213, 223 of the vector execution units are connected to the program memory 211 of the controller core 201 via the issue logic, to receive issue signals related to instructions from the program memory.

In the description above, the issue logic decodes the instruction word to obtain the issue signal and sends this issue signal to the vector execution unit as a separate signal. It would also be possible to let the vector controller of the vector execution unit generate the issue signal locally. In this case, the issue signals are created by the vector controller based on the instruction word in the same way as it would be in the issue logic.

The functions of the data paths 217, 227 and the vector loadstore units 215, 225 are known in the art.

There could be an arbitrary number of vector execution units, including only CMAC units, only CALU units or a suitable number of each type. There may also be other types of vector execution unit than CMAC and CALU. As explained above, a vector execution unit is a processor that is able to process vector instructions, which means that a single instruction performs the same function to a number of data units. Data may be complex or real, and are grouped into bytes or words and packed into a vector to be operated on by a vector execution unit. In this document, CALU and CMAC units are used as examples, but it should be noted that vector execution units may be used to perform any suitable function on vectors of data.

Figure 2:
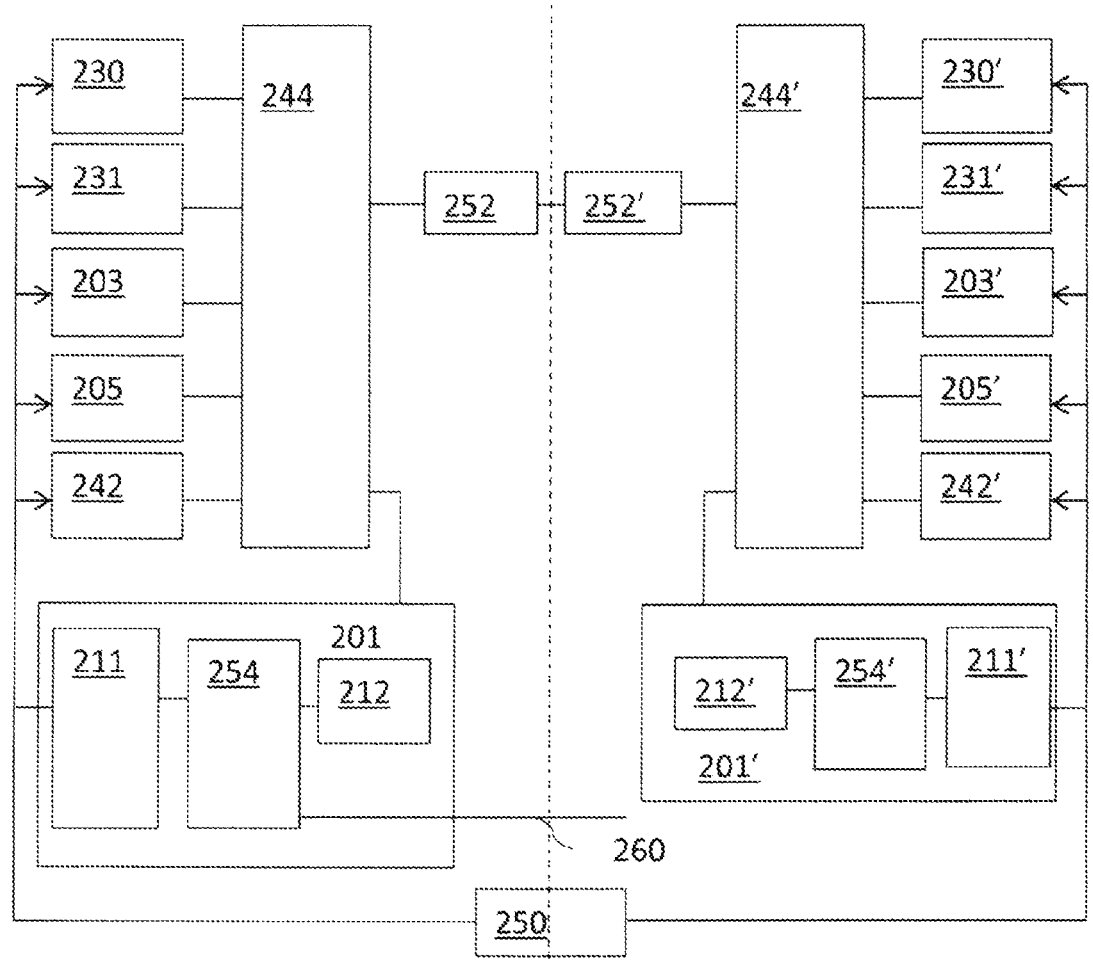
FIG. 2 shows two SIMT type DSPs interconnected according to an embodiment of the invention.

As is common in the art, the BBP of FIG. 2 may also include one or more integer memory banks 238, each including a memory 239 and an address generation unit 240.

Typically, but not necessarily, a number of accelerators 242 are connected, since they enable efficient implementation of certain baseband functions such as channel coding and interleaving. Such accelerators are well known in the art and will not be discussed in any detail here. The accelerators may be configurable to be reused by many different standards.

An on-chip network 244 connects the controller core 201, the digital front end unit 209, the host interface unit 207, the vector execution units 203, 205, the memory banks 230, 231, the integer bank 238 and the accelerators 242.

The vector execution units 203, 205 are connected to the other units of the processor, such as memory banks 230, 231, accelerators 242 through the network 244.

In one embodiment, the instruction set architecture for processor core 201 may include three classes of compound instructions. The first class of instructions are RISC instructions, which operate on integer operands. The RISC-instruction class includes most of the control-oriented instructions and may be executed within integer execution unit 212 of the processor core 201. The next class of instructions are DSP instructions, which operate on complex-valued data having a real portion and an imaginary portion. The DSP instructions may be executed on one or more of the vector execution units 203, 205. The third class of instructions are the Vector instructions. Vector instructions may be considered extensions of the DSP instructions since they operate on large data sets and may utilize advanced addressing modes and vector support. The vector instructions may operate on complex or real data types.

FIG. 2 shows a processor assembly comprising a first and a second processor that are interconnected according to the invention. Each of the processors may be a DSP as discussed in connection with FIG. 1. In the first processor of FIG. 2 the same reference numerals are used for the same types of units. In the second processor the same reference numerals with a prime symbol. Hence, the first processor comprises a core 201 and two execution units 203, 205 and the second processor comprises a core 201' and two execution units 203', 205', etc.

According to the invention, the control units of the first processor are arranged to enable the control functions of the second processor to influence units in the first processor and vice versa. The control units of the first processor are also arranged to influence units in the second processor when the control functions of the second processor have allowed this, and vice versa. There are different ways in which units in one processor can be influenced by control units in the other processor. FIG. 2 illustrates several such ways, which may be implemented independently of each other.

Between the control units of the first and second processor a core to core interface unit 250 is connected, to allow the cores 201, 201' of the processors to exchange messages with each other. The core to core interface unit will be discussed in more detail in connection with FIG. 3.

One way of influencing the units of the other processor is illustrated by means of a first and a second bridge unit 252, 252', belonging to the first and the second processor, respectively. The bridge units 252, 252' are interconnected, and are connected to the on-chip networks 244, 244' of the first and second processor, respectively. Hence, the two bridge units together interconnect the on-chip networks 244, 244' of the two processors. Through the bridge units, the two processors can access each other's memory units 230, 231. This means that through the bridge units a vector execution unit in the first processor can access memory data in a memory unit belonging to the second processor.

Normally, in this mode, referred to as bridge mode, the bridge units 252, 252' will be connected in a master-slave configuration. Preferably, each bridge unit can function both as a master and as a slave. Data can be read and written in both directions in a master-slave configuration. For example, an execution unit 203, 205 in the first processor requesting data from a memory 230' 231' in the second processor, or writing data to this memory, will function as a master to the bridge unit 252 on the side of the first processor. The bridge unit 252' on the side of the second processor will function as a master to the memory unit, which will function as a slave. The bridge unit may also be implemented as one unit.

All writes to the bridge port on the master side will be forwarded to the slave side and to the connected slave unit. The data will be delayed for a few cycles in the bridge pipeline before being written to the slave unit on the remote network.

It is also possible to transfer data from a memory unit in the first processor to a memory unit in the second processor and vice versa through the bridges 252, 252'. In this mode, called DMA mode, each bridge unit 252, 252' will function as a master on its respective crossbar switch 244, 244'.

As mentioned in connection with FIG. 1, each core 201, 201' comprises a program memory 211, 211', respectively and an integer execution unit 212, 212', respectively. An issue logic unit 254, 254' is arranged in each core, between the program memory 211, 211' and the execution units 212, 212'. As indicated in FIG. 2 there is a remote connection 260 from the issue logic unit 254 of the first processor to the second processor. This remote connection 260 is arranged to send instructions from the first processor to be executed by units in the second processor. This means that an instruction held in the program memory 211 of the first processor can be sent directly to the desired functional unit in the second, remote, processor without having to be stored in the program memory 211' of the second processor. The connection of the remote connection 260 to the units on the remote side will be discussed in more detail in connection with FIG. 5. For handling the remote control some additional functions are needed in connection to the issue control unit 254. These are not shown separately in FIG. 2 but will be discussed in connection with FIGS. 4A and 4B. Normally, there will be a similar connection from the issue logic unit of the second processor to the units of the first processor. This connection is not shown in the drawing, for clarity reasons.

Figure 3:
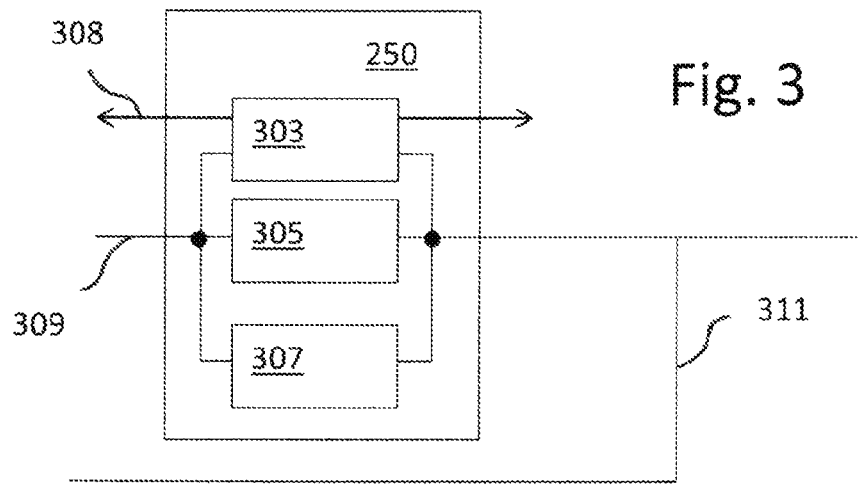
FIG. 3 shows a core to core interface unit according to an embodiment of the invention.

FIG. 3 shows a core to core interface unit 250 according to an embodiment of the invention. The interface unit comprises an interface control unit 303 and a first and a second queue 305, 307 for transferring data from the first processor to the second processor and vice versa, respectively. In this way control messages can be written by one processor to registers such as address registers in the other processor. The interface control unit 303 comprises one or more control registers and one or more data registers. Data that is written to the first queue from the core of the first processor can be read by the core of the second processor, which is in this case the remote core. Data that is written to the second queue from the core of the second processor can be read by the core of the first processor, which is in this case the remote core. Both these operations are performed by the remote core reading the DATA register. The control register has status bits to indicate the status of the data registers, for example if they are full or empty. The queues are preferably FIFO queues.

A CRF bus 309 (Control Register File bus) connects both the control register 303 and the queues 305, 307 to the core of the respective processor and to all the units of the processor. As indicated by the line 311, the CRF bus 309 is also connected from the second side of the interface unit 250 to the core of the first processor. There is a similar connection (not shown for clarity) from the first side of the interface unit 250 to the core of the second processor.

Data to be transferred between the cores are typically organized in data packets. The size of a packet may be arbitrarily decided by the user.

The interface unit can also be used by the first core to generate an interrupt in the second core and vice versa. The interface unit holds a counter that counts the number of outstanding data packets that have not yet been read by the remote core. The counter is incremented when a packet is written to the data register and decremented when a packet is read from the data register. Each time the counter goes from 0 to 1 or is decremented but still larger than 0 an interrupt will be generated. The interrupt signals may be transferred from the first core to the second core and vice versa on a connection 308.

FIG. 4A illustrates the functions needed in the core of the first processor for remote control of the units in the second processor. The core comprises a program memory 211 holding instructions for functional units both in the first and in the second DSP. A pre-decode unit 321 is arranged to determine which functional unit should receive each instruction being read from the program memory. When instructions are to be sent to the remote DSP, that is, in this example the second DSP, they are sent through the remote connection shown in FIG. 2. This remote connection actually carries a bundle of signals as will be discussed in connection with FIG. 5, which depicts the handling of the signals on the remote side. The instruction word is sent directly from the program memory 211 to the remote units, as shown by the arrow denoted Remote_Instruction in FIG. 4A. The issue signal, which carries the information about which functional unit should perform the instruction, is sent through a demultiplexer 323.

In the local core, a mask unit 325 receives the issue signal and determines which functional unit or units should receive the instruction. This functional unit may be a functional unit in the first processor, a functional unit in the second processor, or a group of functional units comprising functional units from one of the processors or from both processors. The function of the mask unit 325 will be discussed in more detail in the following. When the mask unit has determined, based on the control information, which functional unit or units should perform the instruction, an issue signal is sent to these functional units. A separate issue signal is sent for each functional unit, as shown by the arrows denoted issue signal 1 and issue signal n in FIG. 4A.

According to the embodiment shown in FIG. 4A this is achieved in the following way. The mask unit 325 comprises a register 326 holding information about which functional unit or units correspond to the issue signal received from the demultiplexer. This information is forwarded from the mask unit to the core to core interface unit. The actual functional unit or units to receive the instruction may be obtained in logic operations units 327 which performs a logical operation on the issue signal and the information held in the mask unit. There is one logic operations unit for each possible functional unit in an issue group.

FIG. 4B shows an example of register 326 according to the above embodiment. The filter unit comprises a mask identifying the vector execution units in a group of vector execution units that should actually receive the instruction. In practice, the mask has one bit for each vector execution unit, which may be set to 0 or 1, to indicate if the vector execution unit should be included in the issue group or not. This information is combined in the corresponding logic operations unit 327 with the information held in the issue signal to determine which vector execution units are to receive the instruction. In the example in FIG. 4B, nine vector execution units are potentially included in the issue group. The information stored in the mask unit indicates that the first and the last of these execution units should actually participate in executing the instruction.

Instead of using a mask unit as discussed in connection with FIGS. 4A and 4B it would be possible to have all functional units hard coded in the core. The mask unit provides a greater flexibility to the processor by enabling addition and deletion of functional units that may be controlled by a particular processor. Alternatively, the selection of vector execution units could be made by the mask unit without the use of an issue signal. This would, however, be less efficient.

FIG. 5 illustrates the handling of remote instructions at the receiving side, that is, in this example, in the second processor. For simplicity, a first 501 and a second 503 functional unit are shown in the Figure. To enable the functional units 501, 503 to receive instructions from more than one core each functional unit is equipped with a first multiplexer 505, 506, respectively, which is arranged to receive instruction words from two or more sources and feed the appropriate signal to the functional unit. Each functional unit 501, 503 is also equipped with a second multiplexer 507, 508, respectively, which is arranged to receive issue signals from two or more sources and feed the appropriate signal to the function unit.

The local instructions, coming from the second core in this case, are received on a connection marked LOCAL. The local issue signals are received on connections marked EU0 and EU1, respectively, shown only schematically.

The communication with the remote control unit is shown as a bundle of five lines, corresponding to the remote connection shown in FIG. 2. As can be seen by the uppermost of the lines in the bundle, marked INSTR, the remote instruction word is transmitted to both the functional units. As usual, the functional unit or units indicated in the issue signal will process the instruction. The next two lines, collectively marked ISSUE are used to transmit the issue signal to the first and the second functional unit, respectively. The lowermost two lines, collectively marked READY in the bundle are used to carry ready signals from the first and the second execution unit, respectively, back to the core of the first processor. A ready signal may be sent by an execution unit to inform the core that the execution unit is ready to receive another instruction and may initiate an interrupt signal.

In the example shown in FIGS. 4A and 5 it is assumed that there are two processors interconnected so that each functional unit can be controlled either by its local core or remotely from the other core. As the skilled person would realize, more than one remote processor could be connected. In FIG. 5 one additional remote processor would be illustrated by another bundle of connections, connecting each functional unit to the additional processor in the same way as shown for the one remote processor in FIG. 5. This means that the instruction words and issue signals would be transmitted to the functional units through the multiplexers and the READY signals would be transmitted from the execution units to the remote control units of the remote processors. Instead of sending an instruction word and an issue signal separately, it would be possible to send an instruction word comprising the issue signal and let the receiving functional unit retrieve the issue signal to determine if a particular instruction word was intended for this functional unit.

It would also be possible to address more than one functional unit at a time, by dividing the functional units into issue groups. Co-pending application No. SE1151231-6 discloses the use of issue groups within one SIMT type DSP. Issue groups are groups of execution units that are configured to perform the same vector instruction on different data. Issue groups may be specified in a similar way as the addressing of functional units discussed in connection with FIGS. 4A and 4B. To address an issue group, the mask unit shown in FIG. 4B should specify more than one functional unit.

In the context of the present invention, it would be possible to let the first processor access issue groups in the second DSP, in the same way as it addresses vector execution units in the second DSP, and vice versa. It would also be possible to define issue groups comprising vector execution units from both DSPs.

As will be understood, not all the units described are needed in both processors in order to achieve the desired functions. In the simplest case, only the remote processor would need to have memory units or functional units. The functional units could be only execution units, only accelerator units, or a combination of both.

The invention claimed is:

1. A processor assembly, comprising:
   a first processor comprising:
   a first core comprising a program memory, instruction issue logic, an integer execution unit, and a mask unit;
   at least a first vector execution unit;
   at least a first memory unit arranged to hold data to be operated on; and
   a first network interconnecting the first core, first vector execution unit and first memory unit, each one to each other one directly; and
   a second processor comprising a second core comprising a second issue logic unit arranged to transmit an instruction word and an issue signal to a functional unit in the first processor,
   wherein the program memory of the first core is arranged to hold instructions for functional units in the first and the second processor,
   wherein the mask unit is arranged to receive the issue signal and determine which functional unit or units in the processor assembly should receive the instruction word,
   wherein the mask unit comprises a register to hold information about which functional unit or units correspond to the issue signal,
   wherein the mask unit is arranged to permit multiple functional units in the processor assembly to receive the instruction, the multiple functional units comprising at least one functional unit in the first processor and at least one functional unit in the second processor, and
   wherein the first core is arranged to enable the second core to control at least one of the first vector execution unit and the first memory unit in the first processor.

2. The processor assembly of claim 1, further comprising a core-to-core interface unit comprising at least a first queue arranged to store first messages from the first core in such a way that they are retrievable by the second core.

3. The processor assembly of claim 2, wherein the core-to-core interface unit is implemented as having a local side and a remote side.

4. The processor assembly of claim 2, wherein the core-to-core interface unit further comprises a second queue arranged to store second messages from the second core in such a way that they are retrievable by the first core.

5. The processor assembly of claim 1, wherein the second processor comprises at least two units, each selected from the group consisting of vector execution units, memory units and accelerators, the second core and the two units being interconnected by a second network.

6. The processor assembly of claim 5, further comprising a bridge unit interconnecting the first network and the second network, said bridge unit being arranged for the transfer of data between at least one of two units in the first processor and at least one of the two units in the second processor.

7. The processor assembly of claim 1, wherein the first vector execution unit has a first multiplexer arranged to receive instructions from the first and second core, respectively, and to forward the instructions to the vector execution unit.

8. The processor assembly of claim 1, further comprising a connection from the instruction issue logic of the first core to the second processor arranged to send instructions from the program memory of the first core directly to one or more functional units in the second processor without having to be stored in a second processor program memory.

9. The processor assembly of claim 8, further comprising a connection from instruction issue logic of the second core to the first processor arranged to send instructions from the program memory of the second core directly to one or more functional units in the first processor without having to be stored in the program memory of the first processor.

10. The processor assembly of claim 8, wherein the remote connection carries a bundle of signals.

11. The processor assembly of claim 10, wherein the remote connection comprises a bundle of five lines.

12. The processor assembly of claim 1, wherein the second processor does not comprise a vector execution unit.

* * * * *